(12) United States Patent
Nado et al.

(10) Patent No.: US 6,311,166 B1
(45) Date of Patent: *Oct. 30, 2001

(54) METHOD FOR ANALYZING EFFECTIVENESS OF INTERNAL CONTROLS IN A MODEL OF AN ACCOUNTING SYSTEM

(75) Inventors: Robert A. Nado; Mitra M. Chams; Jefferson L. Delisio, all of Mountian View, CA (US); Walter C. Hamscher, Concord, MA (US); Robert W. Halliday, West-Lothian (GB)

(73) Assignee: Price Waterhouse World Firm Services BV, Amsterdam (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/687,288

(22) Filed: Jul. 25, 1996

(51) Int. Cl.[7] .................................................. G06F 17/60
(52) U.S. Cl. ............................ 705/30; 705/31; 705/32; 705/34
(58) Field of Search ........................ 395/500, 183.02, 395/183.14; 364/550, 406, 235, 221; 345/967; 371/20.1, 11.2, 15.1; 705/30, 31–32, 34; 707/104; 706/916, 922

(56) References Cited

U.S. PATENT DOCUMENTS

| 5,117,356 | 5/1992 | Marks .................................. 705/30 |
| 5,168,563 | 12/1992 | Shenoy et al. ........................ 395/50 |
| 5,249,300 | 9/1993 | Bachman et al. .................... 707/104 |
| 5,297,150 | 3/1994 | Clark .............................. 395/183.02 |

(List continued on next page.)

FOREIGN PATENT DOCUMENTS

92/05485 * 4/1992 (WO) .............................. G06F/17/60

OTHER PUBLICATIONS

Mock T. and Wright A., An exploratory study of auditors' evidential planning judgments, Auditing, V12, 12, p. 39(15).*

Enrado P., Application Watch. (the French...; and Price Waterhouse Technology Centre's knowledge–based systems for financial auditors...), AI Expert, v9, n3, p.48(1).*

Nelson, N.K., Strategies of auditors: Evaluation of Sample results, v14, Issue 1, p.34 (13).*

Auditing Practices Board–UK, Statement of Auditing Standards 300: Auditing and Internal Control Systems and Audit Risks Assessmentsv, V115, Issue 1220, p.127(11).*

Maletta M. and Wright A., Audit Evidence Planning: An Examination of Industry Error Characteristics, Auditing: A Journal of Practice & Theory, V15, N1, Sprg 96.*

(List continued on next page.)

Primary Examiner—Vincent Millin
Assistant Examiner—Pedro R. Kanof
(74) Attorney, Agent, or Firm—John M. Johnson; Gregory Silberman; Kaye Scholer LLP

(57) ABSTRACT

A method is provided for assessing control risk in a model-based reasoning system used for analyzing financial accounting systems by decomposing and quantifying the risk factors in the model so that the risk factors can be used to determine the areas in the accounting system where sufficient control is lacking and to determine which controls are key and thus should be subject to detailed testing. Factors quantified are failure impact risk, failure coverage risk, allowable risk, control detection risk, control strength, control defeat factor, attenuation factor, and control contribution. The present invention is used to enhance a hierarchical flow chart generating system, such as the Comet system, by providing risk analysis operative on a particular class of hierarchically structured flow charts.

6 Claims, 4 Drawing Sheets

U.S. PATENT DOCUMENTS

| | | | | |
|---|---|---|---|---|
| 5,317,504 | * | 5/1994 | Nakayama | 364/406 |
| 5,371,680 | * | 12/1994 | Anno et al. | 364/478 |
| 5,390,113 | * | 2/1995 | Sampson | 364/419.19 |
| 5,428,554 | | 6/1995 | Laskoski | 395/183.14 |
| 5,428,619 | | 6/1995 | Schwartz et al. | 372/20.1 |
| 5,448,641 | * | 9/1995 | Pintsov et al. | 380/51 |
| 5,448,729 | * | 9/1995 | Murdock | 395/600 |
| 5,455,407 | * | 10/1995 | Rosen | 235/380 |
| 5,564,005 | * | 10/1996 | Weber et al. | 395/161 |
| 5,568,491 | * | 10/1996 | Beal et al. | 371/30 |
| 5,623,534 | * | 4/1997 | Desai et al. | 379/59 |
| 5,625,669 | * | 4/1997 | McGregor et al. | 379/58 |
| 5,629,981 | * | 5/1997 | Nerlikar | 380/25 |
| 5,638,519 | * | 6/1997 | Haluska | 395/228 |
| 5,680,530 | * | 10/1997 | Selfridge et al. | 395/140 |
| 5,764,953 | * | 6/1998 | Collins et al. | 395/500 |
| 5,768,565 | * | 6/1998 | Matsuda et al. | 395/500 |

OTHER PUBLICATIONS

Hamscher, W.C., "Modeling Accounting Systems to Support Multiple Tasks: A Progress Report", in Proc. 10th National Conf. on Artificial Intelligence, San Jose, CA, Jul. 1992.

Nado, B., et al., "The Savile Project", Price Waterhouse Technology Centre, Oct. 1995.

* cited by examiner

METHOD FOR ANALYZING EFFECTIVENESS OF INTERNAL CONTROLS IN A MODEL OF AN ACCOUNTING SYSTEM

BACKGROUND OF THE INVENTION

This invention relates to modelling of accounting systems and more particularly to mechanisms for analyzing the risk that internal controls fail to detect errors that occur in the processing of transactions in an accounting system.

Auditors have the task of determining whether financial statements of a company fairly represent a company's financial position. A problem is gauging how much reliance can be placed on the company's accounting systems. Accounting systems contain internal controls, i.e., procedures that are designed to detect and correct errors and irregularities that may occur during transaction processing. It is an extremely difficult task to anticipate errors that can occur, to determine subsequent effects and to evaluate the effectiveness of controls for detecting errors. Other tasks for which an effective evaluation of internal controls is important are a company's internal audit of its accounting systems, re-engineering of business processes implemented in an accounting system, and review of implementation plans for new accounting systems.

A model-based reasoning system has been under development at Price-Waterhouse Technology Centre in Menlo Park, Calif., as reported in "Modeling accounting systems to support multiple tasks: a progress report," by Dr. Walter C. Hamscher, as found in the Proceedings of the Tenth National Conference on Artificial Intelligence, San Jose, Calif. July 1992. It described an approach to analyzing failures and their detection by controls without providing a quantitative assessment of the likelihood of detection. A further model-based reasoning system called Comet has formed the basis for further development of the quantitative analysis of accounting systems and their controls. A version called Comet IA without quantitative analysis was first released to licensees in early 1996. The Comet system is used to generate a class of hierarchically structured flowcharts that can be used to model the intended processing of transactions in an accounting system. It is a useful platform for providing a capability for quantitative analysis of control risk. Other systems for constructing flow chart models of accounting systems might also be used as a platform.

SUMMARY OF THE INVENTION

According to the present invention, a method is provided for assessing control risk in a model-based reasoning system used for analyzing financial accounting systems by decomposing and quantifying the risk factors in the model so that the risk factors can be used to determine areas in the accounting system where sufficient control is lacking and to determine which controls are key and thus should be subject to detailed testing. Factors quantified are failure impact risk, failure coverage risk, allowable risk, control detection risk, control strength, control defeat factor, attenuation factor, and control contribution. The present invention is used to enhance a hierarchical flow chart generating system, such as the Comet system, by providing risk analysis operative on a particular class of hierarchically structured flow charts of the type such as generated with a Comet system.

The invention will be better understood upon reference to the following detailed description and the accompanying drawings.

DESCRIPTION OF SPECIFIC EMBODIMENTS

Figure 1:
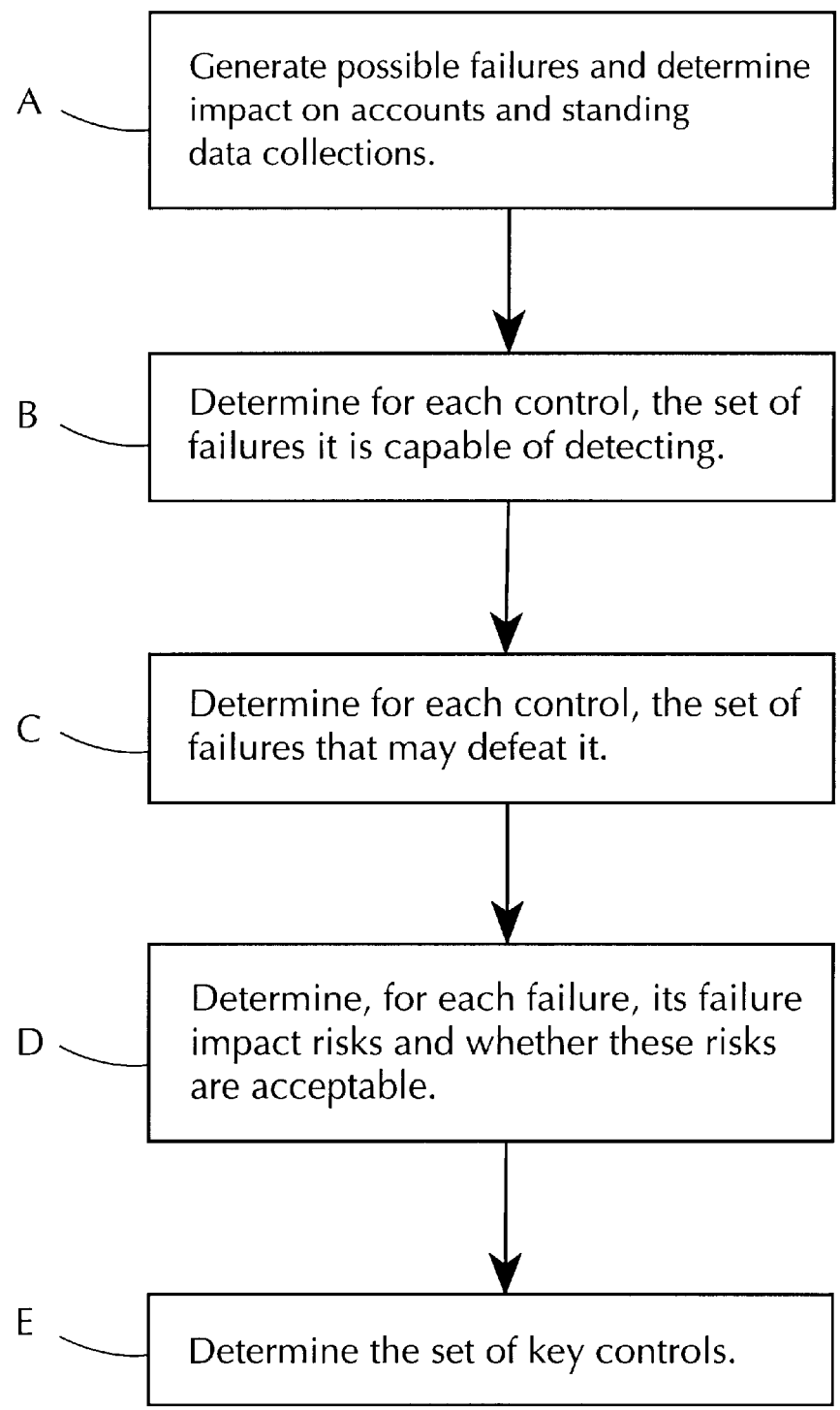
FIG. 1 is a flow chart of the stages of analysis according to the invention.

This invention focuses on a computer-based method and system for analysis of risk in a particular class of hierarchically structured flow charts of the type generated by the Comet system, which is used for a business audit. Other systems which generate hierarchically structured flow charts could be used with the present invention.

Classes of Flow Charts to be Analyzed

Flow charts are composed of nodes, representing for example processes and collections of data records, and arcs representing processing sequences and data flow. The nodes in the class of flowcharts to which the analysis method applies are of several different types: activity nodes, collection nodes, control nodes, selector nodes, decision nodes, branch nodes, and boundary nodes.

Activity nodes are used to represent actions or processes in the accounting system to be analyzed. Activity nodes can be either primitive or composite. This is determined by assigning a type (class) to an activity node. Nodes with a composite activity type represent an activity or process that can be described in more detail by associating a subsidiary flowchart with the node. Nodes in the subsidiary flowchart are referred to as "children" of the decomposed node, and it is referred to as their "parent". There is a set of primitive activity types (also called "verbs") that represent the fundamental actions that take place in an accounting system at a level of abstraction appropriate to an analysis of controls' effectiveness. Nodes with primitive activity types cannot be decomposed into further processing detail.

Collection nodes are used to represent sets of records involved in the processing of transactions by the accounting system. Collection nodes of various types can represent sets of paper forms, computer data bases, transaction files, and general ledger accounts. Two types of collection node have special significance as they are the starting points for the analysis algorithm. Account collection nodes represent general ledger accounts. Standing data collection nodes represent collections of reference data that are made use of during the course of processing transactions in an accounting system but are not updated by those transactions. Rather, they have separate maintenance processes that may occur periodically, independent of the main flow of processing. Standing data collections are often used to supply information used by a control in its operation and upon which the proper operation of the control depends. Collection nodes may be connected to an activity node by arcs in the flowchart to indicate the data inputs and outputs of the action or process represented by the activity node.

Control nodes represent internal controls performed as part of the accounting system. These include both processing controls that are performed as part of the processing of individual transactions as well as management and independent controls that periodically review general ledger accounts and other important collections. Collection nodes may be connected to control nodes by means of arcs indicating the information examined by the control.

The records contained in collections consist of a set of fields that may accessed and modified by the activities performed in the accounting system. Selector nodes are used to identify the fields accessed or modified from a collection node by an activity node. A selector node is often connected by arcs between an input collection node and an activity node (or between an activity node and an output collection node) to specify the fields accessed (resp. modified) by the activity.

Decision nodes represent conditionals in the processing of transactions by the accounting system. Each decision node has an associated set of branch nodes representing the different possible outcomes of the conditional. An activity node or control node is referred to as "contingent" if its performance depends on the outcome of a decision. Such a node has a set of branch nodes associated with it, called its contingencies, that represent the alternative decision outcomes under which the node will be performed.

A boundary node is used to represent the correspondence between a document or record representing a key point in the processing of a transaction and corresponding entries in general ledger accounts. Common examples would be documents or records indicating that an obligation has been incurred or discharged related to asset and liability accounts that should be credited or debited to record the effects of the event. A boundary node has an incoming arc from the collection containing the documents or records and outgoing arcs to the relevant account collections. Boundary nodes are used in the analysis to properly classify possible failures as to the type of error they could produce on an account.

Flowcharts may contain two kinds of arcs, data flow arcs and precedence arcs. Data flow arcs, referenced above, connect collection nodes and activity nodes, possibly with intervening selector nodes. Precedence arcs link activity nodes, control nodes, decision nodes, or branch nodes. A decision node is connected by a precedence arc to each of its branch nodes. A node with an incoming precedence arc from another node is referred to as having that node as a predecessor node. A node with an outgoing precedence arc to another node is referred to as having that node as a successor node. A node with predecessor nodes represents an activity, decision or control that is only performed if an activity, decision, or control represented by at least one of its predecessor nodes has been performed.

Analysis Method

Given a hierarchical flowchart model describing the processing of transactions by an accounting system and the internal controls that are performed, the analysis process determines possible failures that may occur in the processing, the impact of the failures on the correctness of entries on important collections, and the risk that if a failure occurs it is not detected by any control.

Stages of analysis:

According to the invention, and referring to FIG. 1, the stages of analysis in the method are:

1. Determine relevant possible failures (Step A)—those that can have an impact on the validity of accounts and standing data collections.
2. Determine for each control, the set of failures it is capable of detecting (Step B).
3. Determine for each control, the set of failures that may defeat it (Step C).
4. Determine, for each failure, its failure impact risks and whether these risks exceed a specified threshold for acceptable risk (Step D).
5. Determine the set of key controls from the resultant decomposition (Step E—optional).

Stated in another way in reference to the environment of a computerized accounting system, the method according to the invention comprises quantitatively evaluating internal controls in accounting operations, comprising the steps of:

a) determining possible failures in processing of transactions in the accounting system which can have an impact on validity of accounts and standing data collections;

b) determining, for each internal control in the accounting system, a first subset of the possible failures which each control is capable of detecting;

c) determining for each said internal control, a second subset of the possible failures which may inhibit each control;

d) determining, from at least the first subset and the second subset (since there may be other possible failures), "failure impact risk measures," where each failure impact risk measure is a quantitative assessment of the likelihood that each possible failure, if the possible failure were to occur, would have an impact on validity of an account collection and not be detected by any control in the computerized accounting system; and e) outputting whether the failure impact risk measures exceed preselected thresholds for acceptability.

The additional optional stage is that of determining a set of key controls from the first and second subsets of possible failures (based on control detection measure which are used to compute control contribution measures).

These stages are now explained in greater detail.

1. Determining Relevant Possible Failures

For each account collection and standing data collection, there are "Error" data structure instances generated for each of the error types distinguished by the analysis method: Not Genuine, Not Recorded, and Not Proper Amount. For each error instance, the goal of the Generating Failures stage is to produce the set of possible failures in the accounting process that could produce its error type on its account collection or standing data collection.

A failure that occurs in a primitive activity will have symptoms in the collection that is the output of the failing activity as well as in collections that are modified by primitive activities that are downstream of the failing activity in the flowchart. Symptoms have the same types as failures, but a failure of one type may lead to a symptom of a different type, depending on the intervening processing.

The method for determining the set of possible failures that could produce an error type depends on whether the collection is an account collection or a standing data collection. An account collection may be linked via a boundary node to a collection node representing key documents or records for the transaction being recorded on the account. The set of possible failures for an error type is produced by a set-theoretic operation from the sets of possible failures that produce symptoms of the appropriate types on the account collection and the boundary collection.

A Not Genuine error occurs with respect to an account if a possible failure leads to an unauthorized or duplicate posting on the account collection but does not also lead to a corresponding transaction as reflected by a spurious When applied to the task of auditing a corporation's financial statements, the analysis focuses on the impact of possible failures on the correctness of entries on the general ledger account collections. Since controls may depend for their effectiveness on the proper maintenance of reference information used to perform the control, the analysis also examines the impact of possible failures on the correctness of records on standing data collections that are referenced by controls.

The analysis method distinguishes three different types of possible failure that may occur in an accounting system: Missing, Spurious, and Incorrect. An action has a possible failure of type Missing if it is possible for the action to fail to produce a required record as output. An action has a possible failure of type Spurious if it is possible for the action to produce a record as output that should not have been produced. An action has a possible failure of type Incorrect for each field for which it is possible that the action produces an incorrect value. A possible failure is associated with a primitive activity node; composite nodes have possible failures that are derived from the primitive activity nodes in their subsidiary flowcharts. Each primitive activity type has associated with it the types of failures that are possible for the type of action that it represents.

The analysis method distinguishes three different types of error that may be produced in general ledger account collections as a result of failures that occur in the accounting system: Not Genuine, Not Recorded, and Not Proper Amount. The Not Genuine error occurs if a posting is made to an account collection that does not correspond to an actual transaction. A Not Recorded error occurs if an actual transaction takes place but is not recorded by a posting to the appropriate account. Finally, a Not Proper Amount error occurs if the amount posted to an account does not properly correspond to an amount associated with the actual transaction. record on the boundary collection. Conversely, a Not Genuine error also occurs with respect to an account if a possible failure leads to the absence of an actual transaction as reflected by a missing record on the boundary collection but does not also lead to the absence of a corresponding posting on the account collection. Thus the set of possible failures for the Not Genuine error type is obtained as the union of two set differences—the set of possible failures producing a Spurious symptom on the account collection minus the set of failures producing a Spurious symptom on the boundary collection, and the set of possible failures producing a Missing symptom on the boundary collection minus the set of possible failures producing a Missing symptom on the account collection.

A Not Recorded error occurs with respect to an account if a possible failure leads to the absence of a posting on the account collection but does not also lead to the absence of the actual transaction as reflected by a missing record on the boundary collection. Conversely, a Not Recorded error also occurs with respect to an account if a possible failure leads to an unauthorized or duplicate transaction as reflected by a spurious record on the boundary collection but does not also lead to a corresponding spurious posting on the account collection. Thus the set of possible failures for the Not Recorded error type is obtained as the union of two set differences—the set of possible failures producing a Missing symptom on the account collection minus the set of failures producing a Missing symptom on the boundary collection, and the set of possible failures producing a Spurious symptom on the boundary collection minus the set of possible failures producing a Spurious symptom on the account collection.

The descriptions in the last two paragraphs of how Not Genuine and Not Recorded errors are determined from the symptoms of possible failures take a very strict position on the relevance of possible failures leading to Spurious symptoms on the accuracy of the accounts. If a possible failure leads to an authorized or duplicate transaction but that transaction is properly recorded, then the possible failure is viewed as having no audit significance. However, these possible failures can have significant operational impact on the system being analyzed and there are applications of the analysis method for which they should also be considered in analyzing the effectiveness of internal controls. Including these possible failures in the determination of the Not Genuine and Not Recorded error types can be done as an option to the analysis method.

A Not Proper Amount error occurs with respect to an account if a possible failure leads to an incorrect value for a field posted to the account collection but does not also lead to an incorrect value for a field on the boundary collection. Conversely, a Not Proper Amount error occurs with respect to an account if a possible failure leads to an incorrect value on the boundary collection for one of the account collection's fields but does not also lead to an incorrect value for a field on the account collection. Thus the set of possible failures for the Not Proper Amount error type is obtained as the union of two set differences—the set of possible failures producing an Incorrect symptom on the account collection minus the set of failures producing an Incorrect symptom on the boundary collection, and the set of possible failures producing an Incorrect symptom on the boundary collection minus the set of possible failures producing an Incorrect symptom on the account collection.

Standing data collections are not connected to boundary nodes and account collections are not required to be connected to boundary nodes. For these collection nodes, the sets of possible failures for the Not Genuine, Not Recorded, and Not Proper Amount error types are just the possible failures producing Spurious, Missing, and Proper Amount symptoms, respectively, on the collection.

The analysis method may use a recursive, goal-directed algorithm that starts with a desired symptom type on the starting account or standing data collection and works backwards through primitive activities in the flowchart and their input and output collections accumulating possible failures that could cause the desired symptom type. In working its way backward through the flowchart, such an analysis method makes use of rules that relate a symptom type for a collection to a failure type of a primitive activity that modifies the collection as well as to symptom types for the input collections of the primitive activity.

The determination of possible failures leading to a given symptom on a collection node may be made relative to a particular activity node that takes that collection as an input, called the sink activity. This is done when we are trying to determine the possible failures that could result in the sink activity node producing a particular symptom on its output collection. We need to exclude possible failures of primitive activity nodes that have the sink activity as a predecessor according to the precedence arcs in the flowchart. If an activity is performed after the sink activity any possible failures that it may have cannot affect the performance of the sink activity.

The analysis method allows the flowchart to contain loops of data flow arcs but does not allow loops consisting of precedence arcs. To deal with data flow loops as well as the fact that an activity node may be reached several times in traversing the flowchart, the analysis method caches sets of failures associated with activity nodes. The first time an activity node is visited in search of failures that would produce a symptom of a particular type on its output collection, an empty set of failures for that symptom type is temporarily cached with the activity node and the search proceeds. If a data flow loop leads back to the activity node before the search starting at the activity node has been completed, the empty set of failures is returned, forestalling an infinite loop. When a set of failures has been determined as a result of the search from the activity node, it is cached with the activity node for the particular symptom type. Subsequent visits to the activity node looking for the same symptom type will directly return the cached result instead of redoing the search.

In returning and combining sets of failures, the algorithm also returns information about the activity contingencies for the primitive activity nodes along the paths leading to the activity with the possible failure. For each error instance and each possible failure found to be capable of producing it a failure impact instance is created and indexed both on the error and the failure. The failure impact object stores the impact contingencies—a Boolean combination of decision outcomes that would have to occur in order for the failure to produce the error.

An alternative analysis method may begin with a set of failures and propagate those failures through the flowchart of the accounting system to see if those failures impact on a particular account or standing data collection of interest.

2. Determining Control Detections

Once possible failures have been generated and their impacts determined, the analysis method determines for each control in the flowchart model the failures that control is capable of detecting. At this stage, the determination is qualitative ± finding the set of failures that the control may be able to detect based on the structure of the flowchart. The exact method for calculating the set of potentially detected failure depends on the type of control, but a key component in the determination is a variant of the algorithm described above for determining possible failures that could produce symptoms on a collection.

In returning and combining sets of detected failures, the algorithm also returns information about the activity contingencies for the primitive activity nodes along the paths leading from the control to the activity with the possible failure. For each control and for each possible failure it is found capable of detecting, a detection instance is created and indexed both on the control and the failure. The detection object stores the detection contingencies—a Boolean combination of decision outcomes that would have to occur in order for the control to detect the failure.

3. Determining Control Defeators

Many controls depend on reference information that is used in carrying out the control. This reference information may be modeled by a standing data collection used as an input of a control. If the standing data collection is not properly maintained, the effectiveness of the control is compromised because the data it makes use of may be incorrect. To take this possibility into account the analysis method determines, for each control, those possible failures in the maintenance of its standing data collection that could "defeat" the proper operation of the control. These possible failures are called control defeators.

Depending upon the type of control, defeating failures are determined from the possible failures that produce appropriate symptoms on the standing data collections referenced by the control. The same algorithm for determining possible failures from symptoms is used as in Stage 1.

4. Determining Failure Impact Risks

The key to the analysis of controls is the assessment, for each potential failure, of the risks that the failure, if it occurs, can have an impact on the validity of one of the account collections or standing data collections without being detected by any control in the system. These risk measures are called failure impact risk measures.

As a result of Stage 1, a failure instance has stored with it a set of impact instances, one for each of the account collections and standing data collections whose validity it can affect. A failure impact risk measure is computed for each of these impact instances. As a result of Stage 2, a failure instance also has stored with it a set of detection instances, one for each control that is potentially capable of detecting the failure. Both impact instances and detection instances have an associated set of contingencies. Each contingency is an alternative set of decision outcomes (branch nodes) under which the failure either has the specified impact or may be detected by the specified control. A contingency set can be viewed as a Boolean expression consisting of a disjunction of conjunctions of statements about decision outcomes.

In determining the failure impact risk for a given failure impact, the analysis method considers each of the alternative sets of decision outcomes under which the failure could have that impact and determines the highest level of risk that all the controls that would be operative under a set of decision outcomes would fail to detect the failure. Thus, to determine the failure impact risk for a given failure impact, a contingent failure impact risk is computed for each of the contingencies of the failure impact and the overall failure impact risk is taken as the maximum of these contingent failure impact risks.

In determining the contingent failure impact risk for a failure impact contingency, the analysis method first determines the set of potential detections that could occur given that contingency and then assesses, for each relevant potential detection, the likelihood that the control will nevertheless fail to detect the failure, called the control detection risk. The contingent failure impact risk for a given failure impact contingency is the product of the control detection risk for each detection of the failure that has a contingency that is implied (as a Boolean expression) by the given failure impact contingency. The risks are multiplied together because we assume that the controls operate independently, and for a failure not to be detected, all of the potentially detecting controls would have to miss it.

For a given failure, a summary risk measure called the failure coverage risk can be defined as the most significant failure impact risk for all the impacts of the failure.

To determine the significance of failure impact risks, allowable risk thresholds are associated with accounts by the user of the system to represent the highest level of risk the user is willing to accept that any failure that occurs and is relevant to the account is not detected by any control. The smaller the allowable risk, the more concerned the user is about the accuracy of the system. If the allowable risk is set to 0%, then the user is trying to ensure that any error that would affect an account would be detected and corrected by some control in the accounting system.

To determine the failure coverage risk, each failure impact risk is compared with the threshold of allowable risk associated with the impact's account or standing data collection to obtain a difference measure. The failure coverage risk is that failure impact risk that exceeds its level of allowable risk by the greatest amount or, if every failure impact risk is at or below its level of allowable risk, the failure impact risk that is closest to its level of allowable risk. A failure for which every failure impact risk is at or below its corresponding level of allowable risk is referred to as having its risks mitigated by the controls in the model; otherwise, it has unmitigated risks.

Control Detection Risk

Given a failure and a control that might detect it, the control detection risk is the likelihood that the control does not detect the failure. This risk is calculated as 1—(Maximum Control Detection x Control Detection Score).

Maximum Control Detection is a parameter to the analysis reflecting the intuition that there is no such thing as a perfect control. The default value for this parameter is 0.975. The control detection measure or as commonly referred to, the control detection score is a measure, ranging from 0 to 1, of how well a control can detect a particular failure. So even if a control has the maximum control detection score of 1 for a failure, the analysis method assumes that there is still a 0.025 risk that the control will fail to detect the failure. In situations where a very high level of reliance is to be placed on controls, a single control will not suffice to adequately reduce the failure coverage risk of any given potential failure.

Figure 2:
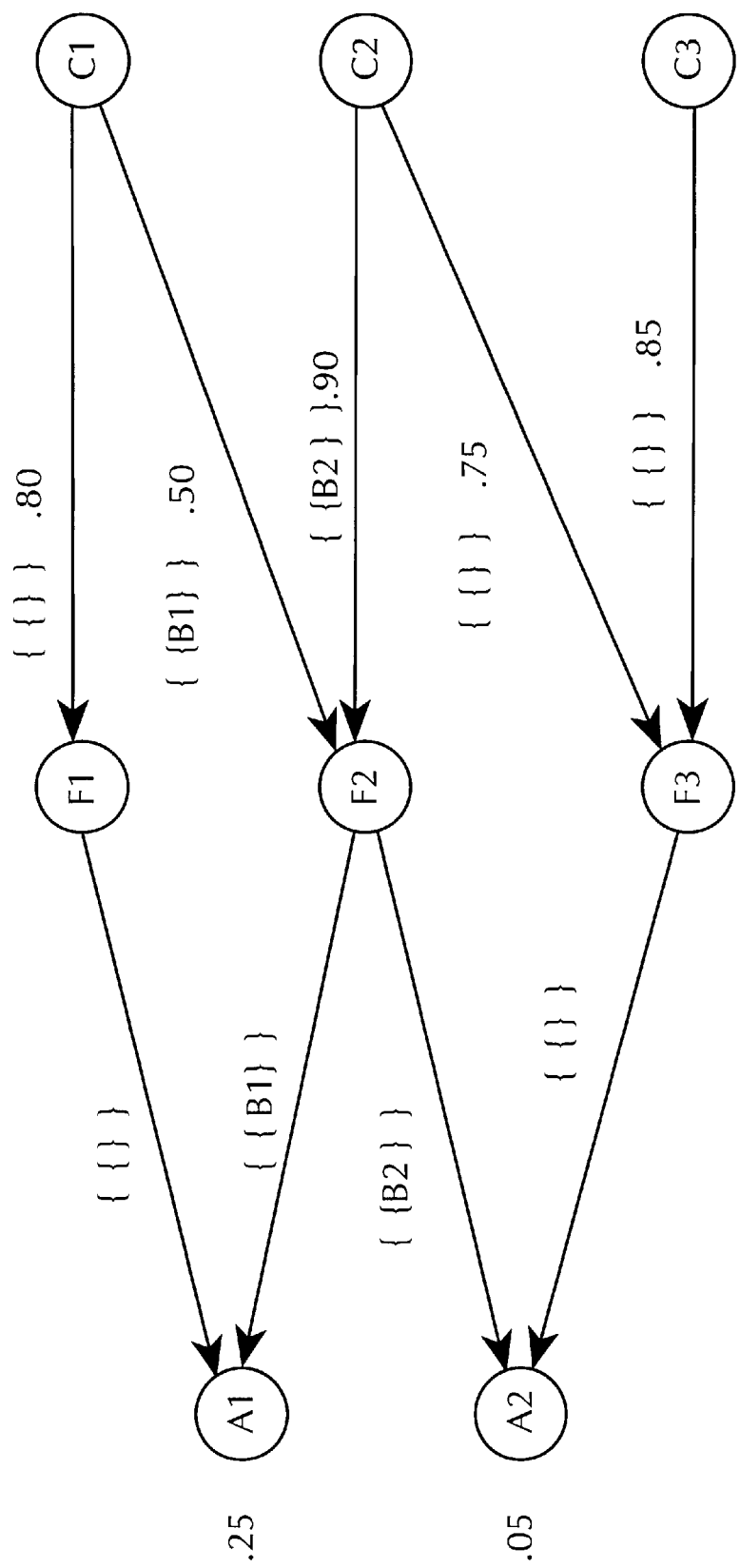
FIG. 2 is a diagram illustrating failure impact risk calculation for an example according to the invention.

As an example of how the failure impact risks for failures are calculated from the control detection scores of the controls that may detect them, consider FIG. 2. FIG. 2 shows three failures, F1, F2, and F3, that have an impact on two different accounts A1 and A2 as indicated by the arcs. Also shown are three controls, C1, C2, and C3, that may detect the failures. The arcs between the failures and accounts are labeled with the corresponding failure impact contingency sets. The arcs between the controls and failures are labeled with the corresponding control detection contingency sets as well the corresponding control detection scores. A contingency set of the form {{}} indicates a non-contingent failure impact or control detection. To determine the failure impact risks for the three failures, we first compute the control detection risks for the control and failure pairs:

CDR(C1,F1)=1−(0.975×0.80)=0.22

CDR(C1,F2)=1−(0.975×0.50)=0.5125

CDR(C2,F2)=1−(0.975×0.90)=0.1225

CDR(C2,F3)=1−(0.975×0.75)=0.26875

CDR(C3,F3)=1−(0.975×0.85)=0.17125

These are the risks that the control does not detect the failure. To obtain the failure impact risk for a failure and account that it impacts, we multiply together the control detection risks for each control detection whose contingency set is implied by the failure impact contingency set:

FIR(F1,A1)=CDR(C1,F1)=0.22

FIR(F2,A1)=CDR(C1,F2)=0.5125

FIR(F2,A2)=CDR(C2,F2)=0.1225

FIR(F3,A2)=CDR(C2,F3)×CDR(C3,F3)=0.26875×0.17125=.C

Since failure F1 only impacts account A1, whose allowable risk is 0.25, F1's failure impact risk of 0.22 is treated as acceptable. Failure F3 has a failure impact risk of 0.046, which is lower than the allowable risk, 0.05, of its only affected account A2, so it is also has an acceptable level of risk. Failure F2, however, has failure impact risks, 0.5125 for A1 and 0.1225 for A2, that are both unacceptable, because each is greater than the allowable risk for its account, 0.25 for A1 and 0.05 for A2. The summary failure coverage risk for F2 is 0.5125 because the failure impact risk for A2 has the largest difference from its 0.25 allowable risk.

Control Detection Score

The control detection score is obtained as a combination of three different factors, each of which affects the likelihood that a control will detect a failure. Each factor ranges from 0 to 1 and is assumed to be independent of the other two, so they are multiplied together to get the control detection score:

Control Detection Score (C,F)=Control Strength (C)*Control Defeat Factor (C)*Attenuation Factor (C,F)  (EQ.1)

The control strength and control defeat factor are independent of the particular failure being considered.

Control Strength

The control strength is an assessment of the intrinsic effectiveness of the control, based on its type and how well it is performed. In Comet, for example, the control strength is initially determined from the answers supplied by the modeler to a series of questions about how the control is performed. Certain control types, in particular management review controls, have a maximum score that is less than 1.

Control Defeat Factor

The control defeat factor is a number between 0 and 1 that measures the degree to which a control is rendered ineffective by problems with the maintenance of standing data collections upon which it depends. For example, an access control cannot be relied upon if there are unmitigated risks associated with the database of user profiles that it employs. A control that is completely defeated has a control defeat factor of 0, since this number will cause the control detection score to be 0. A control that is not defeated at all has a control defeat factor of 1, since this number will not diminish the control detection score.

A control is defeated, to some degree, if there are unmitigated failures in the maintenance process of any standing data collection upon which it depends. Standing data collections are treated very similarly to accounts in that they have an allowable risk and are taken as starting points for generating failures. The control defeat factor is calculated as follows:

Control Defeat Factor (C)=1−Maximum Defeator Risk (f,C)(EQ.2)

where f ranges over the potential failures generated for the maintenance processes of the relevant standing data collections. The defeator risk for a failure and a control is a function of the failure coverage risk of the failure and the minimum allowable risk of all the standing data collections that the failure impacts and upon which the control depends:

Defeator Risk (f,C)=Max O, failure coverage risk (f)−defeat allowable risk (f,C) defeat allowable risk (f,C)  (EQ.3)

The formula above is actually a simplification since it does not deal with the case in which the defeat allowable risk is 0. In this case, the defeator risk will be 1 unless the failure coverage risk for the failure is also 0. The motivation for using this formula is to get a graded degree of defeat proportional to the extent that a failure's coverage risk exceeds its defeat allowable risk, but being stricter for lower values of the defeat allowable risk.

The allowable risk for a standing data collection is obtained from the values for qualitative measures of population size and degree of change using a table lookup.

Figure 3:
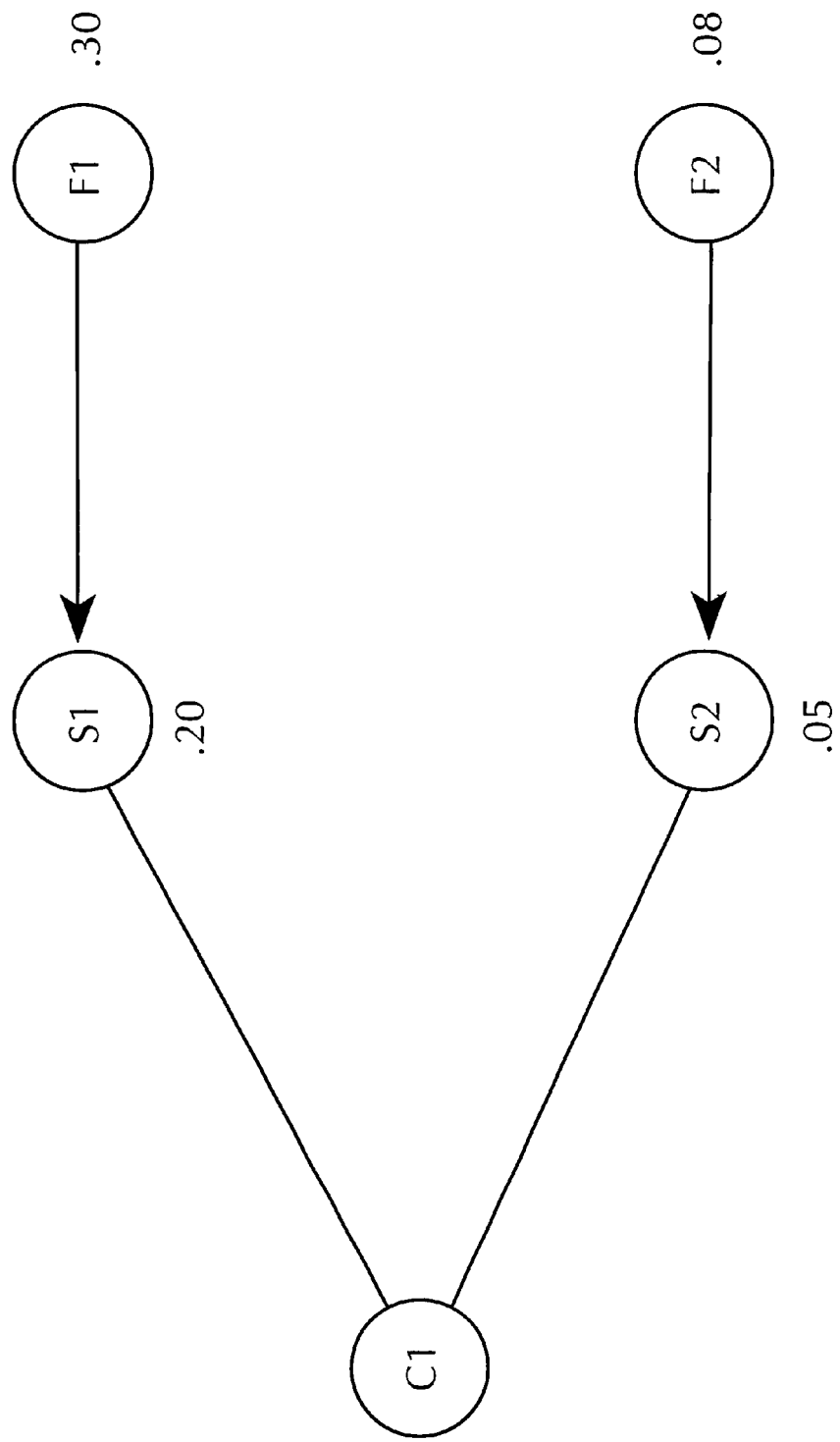
FIG. 3 is a diagram illustrating control defeat factor calculation from failure coverage risks for an example according to the invention.

The control defeat factor for a control is calculated from the failure coverage risks of the failures that may affect its reference data, as in FIG. 3:

In this example, control C1 depends for its proper operation on two standing data collections, S1 and S2. In the maintenance processes for S1 and S2 there are two potential failures, F1 and F2 respectively, with failure coverage risks 0.30 and 0.08. Then the defeator risks are calculated as follows:

$$DR(F1, C1) = \frac{.30 - .20}{.20} = .50 \quad (EQ.4)$$

$$DR(F2, C1) = \frac{.08 - .05}{.05} = .60$$

F2 has the larger defeator risk, even though it has a smaller failure coverage risk, because the standing data collection it affects has a more stringent allowable risk. The control defeat factor for C1 would then be 0.40 (1 minus the largest defeator risk).

Attenuation Factor

The attenuation factor is a number between 0 and 1 that measures the degree to which a control is rendered ineffective by the distance between the control and failure that it may detect. A control that is completely attenuated has a control attenuation factor of 0, since this number will cause the control detection score to be 0. A control that is not attenuated at all has a control attenuation factor of 1, since this number will not diminish the control detection score.

In assessing the likelihood that a given control will detect a given failure, the analysis method takes into account the number of intervening processing steps between the potentially failing action and the control. In general, the more distant the control is from the point of failure, the less effective the control is in detecting the failure. The precise nature of the attenuation, however, depends both on the type (verb) of control and the types (verbs) of the intervening processing steps.

There are three broad categories of control with respect to the effects of attenuation: exact matching controls, management controls, and processing controls. Exact matching controls do not attenuate over ordinary actions. Management controls are relatively weak in terms of control strength. However, they are wide-ranging in their scope, with a high range of effectiveness, so they attenuate slowly over ordinary actions. Processing controls are designed to pick up failures that arise fairly close to the control, with a low range of effectiveness, so they attenuate relatively rapidly over ordinary actions.

Reference was made above to attenuation over ordinary actions. Two types of action, summarizations and extractions, receive special treatment with respect to attenuation because they do not preserve all the information from their input collections in producing their output collections. In many cases, depending on the type of control, a summarization or extraction action may completely block the detective ability of a control.

In determining the attenuation factor for a control and a failure, the analysis method multiplies together individual attenuation factors for each action on the most favorable path between the control and the failure. Each individual step attenuation factor is also a number between 0 and 1, with 0 representing complete attenuation, and 1 representing no attenuation. So the attenuation factor is computed according to the following formula:

$$\text{Attenuation Factor}(C, F) = \underset{p \in \text{Paths}(C,F)}{\text{Max}} \prod_{s \in p} AF(s, C) \quad (EQ.6)$$

where AF is a function for determining the step attenuation factor from type of the step and the type of the control.

Figure 4:
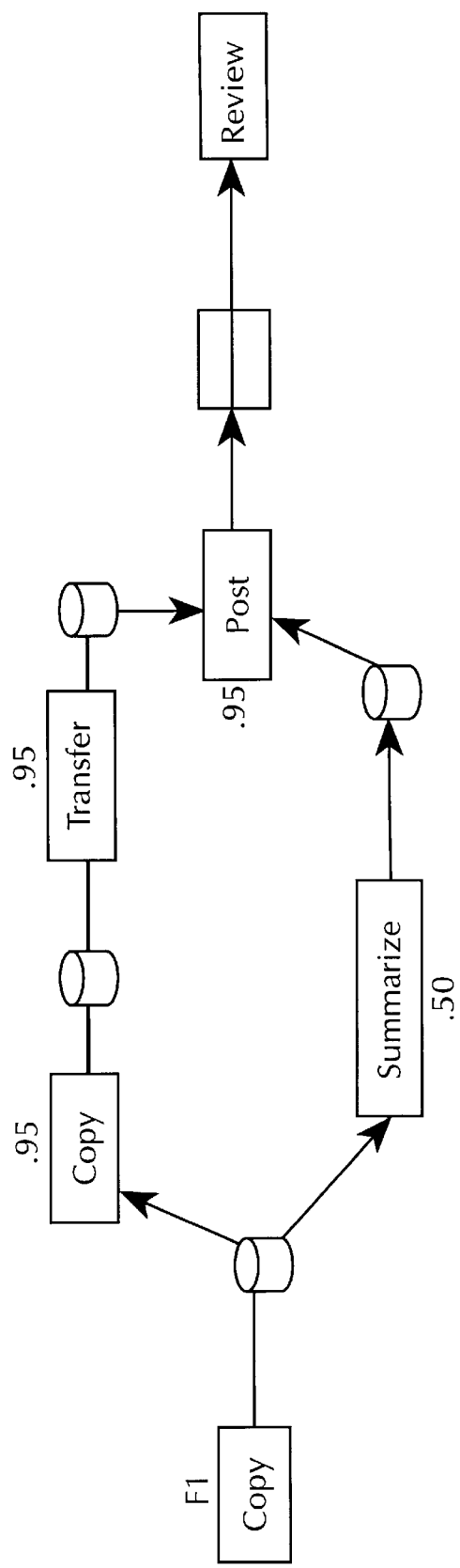
FIG. 4 is a diagram illustrating attenuation factor calculation according to the invention.

As an example of how the attenuation factor for a control and a failure is calculated from the steps intervening between the control and the point of failure, consider FIG. 4. Therein, Failure F1 occurs in a Copy action that produces records on an output collection that are processed by subsequent steps, posted to an account collection, and subsequently examined by a Review control. The figure displays next to each step the attenuation factor for that step. Since the Review control being considered is a management control with a high range, the attenuation factor for ordinary actions is 0.95. The Summarize action, however, has an attenuation factor of 0.50 reflecting that some information is lost in the summarization. The products of the step attenuation factors along the two paths are:

$$AF(Cpy,Rvw) \times AF(Trnsfr,Rvw) \times AF(Post,Rvw) = 0.95 \times 0.95 \times 0.95 = 0.86 \quad (EQ.7)$$

and $$AF(Summarize,Review) \times AF(Post,Review) = 0.50 \times 0.95 = 0.48 \quad (EQ.8)$$

The resulting attenuation factor between the Review control and the point of failure is then 0.86 from the path through the Copy and Transfer, even though it is longer than the path through the Summarize.

5. Determining Key Controls

In selecting a set of key controls for testing, the analysis method uses a relative measure of the importance of a control in reducing the failure coverage risk of potential failures; this measure is called the control contribution measure or control contribution score. The control contribution measure for a control is relative to a set of failures, F, to be covered, and a set of controls, C, to be compared. Then, for each control c in C, the control contribution is computed by:

$$Cntrl\ Cntrb(b) = \sum_{f_i\ detctd\ by\ c} \frac{Cntrl\ Detctn\ Scr(c, f_i)}{\sum_{f_i\ detctr\ of\ c} Cntrl\ Detctn\ Scr(c_j, f_j)} \quad (Eq.9)$$

where the failures and controls summed over are restricted to those in the sets F and C.

The analysis method uses a greedy algorithm for selecting key controls for testing. At each point in the selection process, the set F consists of those potential failures whose risk is sufficiently mitigated (with respect to allowable risks) by the complete set of controls in the model, but not yet by those controls already selected for testing. The set C consists of those controls not yet selected for testing. If there are any failures in F that have unique detectors in C with a non-zero control detection score, all these unique detectors are added to the set of key controls. Otherwise, the next control selected for addition to the key controls is that control with the highest control contribution measure relative to F and C. The algorithm terminates when the set F is empty or there are no controls in C with non-zero control contribution measures.

The invention has now been explained with reference to specific embodiments. Other embodiments will be apparent to those of ordinary skill in the art. It is therefore not intended that this invention be limited, except as indicated by the appended claims.

What is claimed is:

1. A method, operating on a computer having an input means, a memory means, a calculating means and a display device, for quantitatively evaluating internal controls in a model of an accounting system having computerized accounting operations, said method comprising the steps of:

a) inputting said model by said input means so that at least a portion of said model is stored in said memory means;

b) determining possible accounting failures in processing of transactions in said accounting system which can have an impact on validity of accounts and standing data collections by said calculating means;

c) determining for each internal control in said accounting system, a first subset of said possible accounting failures which each internal control is capable of detecting by said calculating means;

d) determining for each internal control, a second subset of said possible accounting failures which may inhibit each internal control by said calculating means;

e) ascertaining from at least said first subset and said second subset, for each said possible failure, failure impact risk measures, each said failure impact risk measure being a quantitative assessment of the likelihood that each said possible accounting failure, if said possible accounting failure were to occur, would have an impact on the validity of a corresponding account collection and not be detected by an internal control in said computerized accounting system by said calculating means; and f) outputting whether said failure risk measures exceed preselected thresholds for acceptability on said display means.

2. The method according to claim 1 further including the step of:

determining a set of key controls from at least said first set of possible failures and said second subset of possible failures.

3. The method according to claim 2 wherein said key controls determining step comprises generating control detection measures from control strength, from control defeat and from attenuation between control and a corresponding failure which is detected, and generating a control contribution measure for each control detection measure.

4. The method of claim 1, wherein said possible failures determining step comprises:

identifying, from structure of said model, said accounts;

identifying, from structure of said model, primitive actions which give rise to said possible failures; and relating, from structure of said model, said accounts to said possible failures.

5. The method of claim 1, wherein said first subset determining step comprises:

identifying, from structure of said model, said internal controls;

identifying, from structure of said model, primitive actions which give rise to said possible failures; and relating, from structure of said model, said controls to said possible failures.

6. The method of claim 1, wherein said second subset determining step comprises:

identifying, from structure of said model, said internal controls;

identifying, from structure of said model, primitive actions which give rise to said possible failures; and relating, from structure of said model, said controls to said possible failures.

* * * * *